United States Patent
Camper

(10) Patent No.: US 10,358,605 B2
(45) Date of Patent: Jul. 23, 2019

(54) PROCESS FOR RENEWABLE FUELS USING A MULTISTAGE APPROACH

(71) Applicant: Saola Renewables LLC, Wichita, KS (US)

(72) Inventor: Dean Camper, Wichita, KS (US)

(73) Assignee: SAOLA RENEWABLES LLC, Wichita, KS (US)

( * ) Notice: Subject to any disclaimer, the term of this patent is extended or adjusted under 35 U.S.C. 154(b) by 0 days.

(21) Appl. No.: 15/599,121

(22) Filed: May 18, 2017

(65) Prior Publication Data

US 2018/0273851 A1 Sep. 27, 2018

Related U.S. Application Data

(60) Provisional application No. 62/338,188, filed on May 18, 2016.

(51) Int. Cl.
| | | |
|---|---|---|
| *C10G 45/58* | (2006.01) | |
| *C10G 3/00* | (2006.01) | |
| *C10G 11/00* | (2006.01) | |
| *C10G 9/00* | (2006.01) | |

(52) U.S. Cl.
CPC ............... *C10G 3/42* (2013.01); *C10G 9/00* (2013.01); *C10G 11/00* (2013.01); *C10G 45/58* (2013.01); *C10G 2300/1018* (2013.01); *Y02E 50/13* (2013.01); *Y02P 30/20* (2015.11)

(58) Field of Classification Search
CPC ........ C10G 2400/04; C10G 2300/1011; C10G 2300/1018; C07C 1/24; C07C 2529/076; C07C 5/03; C07C 5/2775; C07C 7/10; C07C 7/12; C07C 7/13
See application file for complete search history.

(56) References Cited

U.S. PATENT DOCUMENTS

| | | | | |
|---|---|---|---|---|
| 7,982,076 | B2 * | 7/2011 | Marker | C10G 3/46 585/240 |
| 8,026,401 | B2 * | 9/2011 | Abhari | C10G 3/46 208/49 |
| 2006/0207166 | A1 * | 9/2006 | Herskowitz | C10G 45/64 44/385 |
| 2007/0010682 | A1 | 1/2007 | Myllyoja et al. | |
| 2009/0082606 | A1 | 3/2009 | Marker et al. | |
| 2012/0216450 | A1 | 8/2012 | Dupassieux et al. | |
| 2015/0094506 | A1 | 4/2015 | Fichtl et al. | |

OTHER PUBLICATIONS

International Search Report and Written Opinion for PCT/US2018/033467, dated Feb. 18, 2019.

* cited by examiner

*Primary Examiner* — Sharon Pregler
(74) *Attorney, Agent, or Firm* — Kutak Rock LLP; Sean P. Connolly

(57) ABSTRACT

The invention relates to a method to reduce the formation of high molecular weight compounds and catalyst coking in the production of renewable diesel. Renewable diesel is produced using hydrogenation, decarboxylation, decarbonylation, and/or hydrodeoxygenation of renewable feedstocks such as animal and/or plant fats, oils, and/or greases (FOG). By first reacting the most reactive species in the FOG in an initial reaction zone prior to the main reaction zone, maximum reaction temperatures and side reactions that lead to the formation of high molecular weight compounds are reduced. This reduces catalyst coking (extends catalyst life) and improves product quality.

17 Claims, 3 Drawing Sheets

PROCESS FOR RENEWABLE FUELS USING A MULTISTAGE APPROACH

FIELD OF THE INVENTION

In general, this specification relates to a processes for manufacturing fuels from plant and/or animal fats, oils, and/or greases ("FOG"). In particular, the specification relates to processes using hydrogenation, decarboxylation, decarbonylation, and/or hydrodeoxygenation in a reaction zone where a liquid recycle stream is used before the first reactor and/or bed where partial conversion takes palace.

DESCRIPTION OF THE RELATED ART

U.S. Pat. No. 8,022,258 B2 states that the formation of high molecular weight compounds can be significantly reduced by having a recycle ratio of at least 5:1 renewable feed stocks containing more than 5% free fatty acids when using a mild hydrotreating temperature of 280-340° C. U.S. Pat. No. 8,022,258 B2 also states that there is significant formation of high molecular weight compounds during hydrotreating for renewable feedstocks containing more than 5% FFAs. In U.S. Pat. No. 8,022,258 B2 they found that "Due to the free fatty acids contained in bio oils and fats, the formation of heavy molecular weight compounds is significantly increased compared to triglyceridic bio feeds, which have only low amount of free fatty acids (<1%)."

U.S. Pat. No. 7,982,076 B2 purports to disclose a process for the production of renewable diesel from renewable feedstock using a recycle ration of 2:1 to 8:1.

SUMMARY

DETAILED DESCRIPTION

The disclosure relates to a process to reduce the formation of high molecular weight compounds and catalyst coking in the production of renewable diesel. Renewable diesel is produced using hydrogenation, decarboxylation, decarbonylation, and/or hydrodeoxygenation of renewable feedstocks such as animal and/or plant fats, oils, and/or greases ("FOG"). By first reacting the most reactive species in the FOG in an initial reaction zone prior to the main reaction zone, maximum reaction temperatures and side reactions that lead to the formation of high molecular weight compounds are reduced. This reduces catalyst coking (extends catalyst life) and improves product quality.

Figure 1:
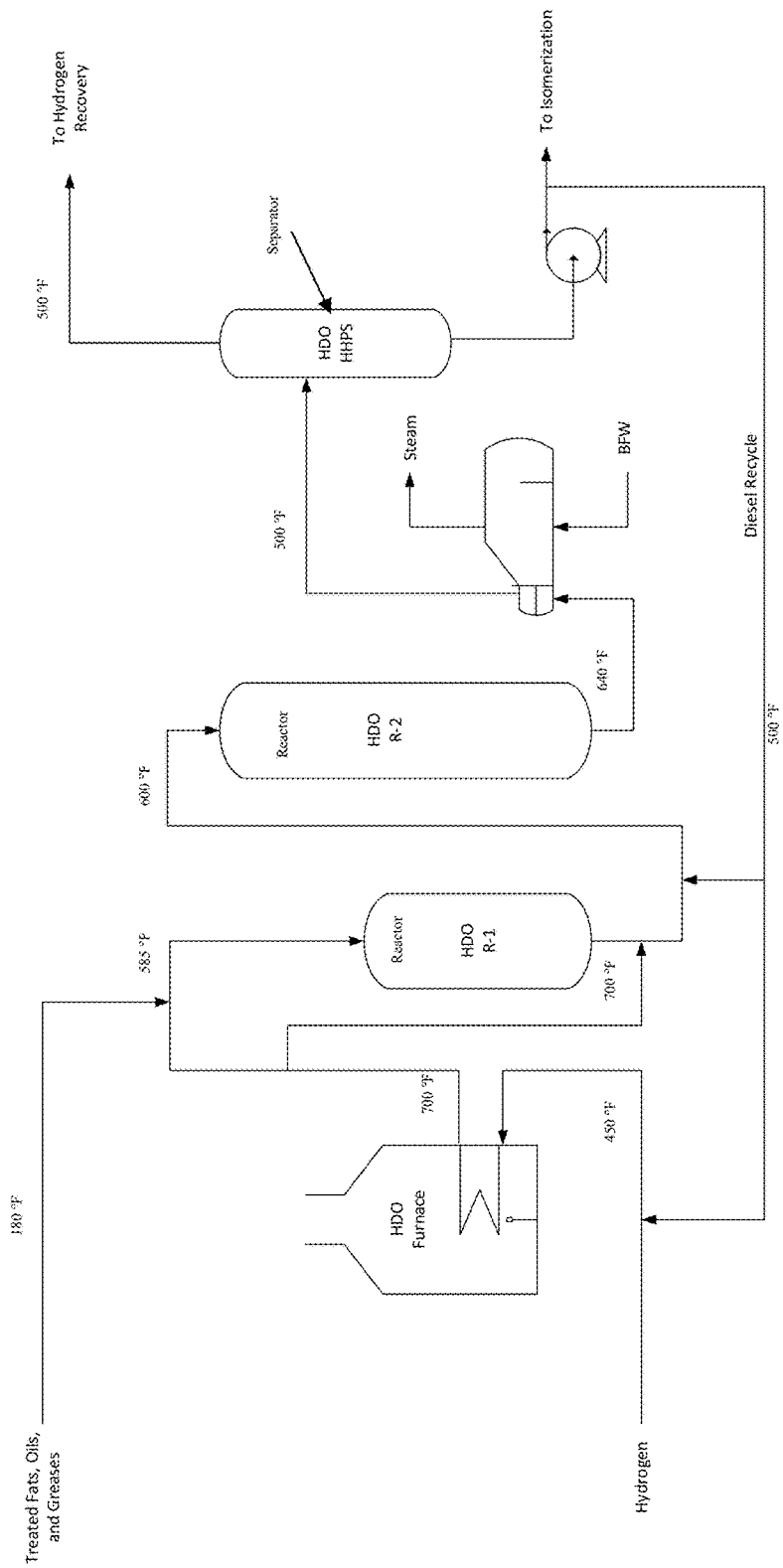
FIG. 1 is a schematic view of a plant operating a process in accordance with the present invention.

FIG. 1 is a schematic view of a pilot plant constructed to carry out the methods disclosed.

Some Characteristics of the First Reactor and/or Bed
  Low activity catalyst
  High liquid hourly space velocity (Total LHSV>5 hr$^{-1}$)
  Reduced inlet temperature
  Partial conversion

EXAMPLE 1

Figure 2:
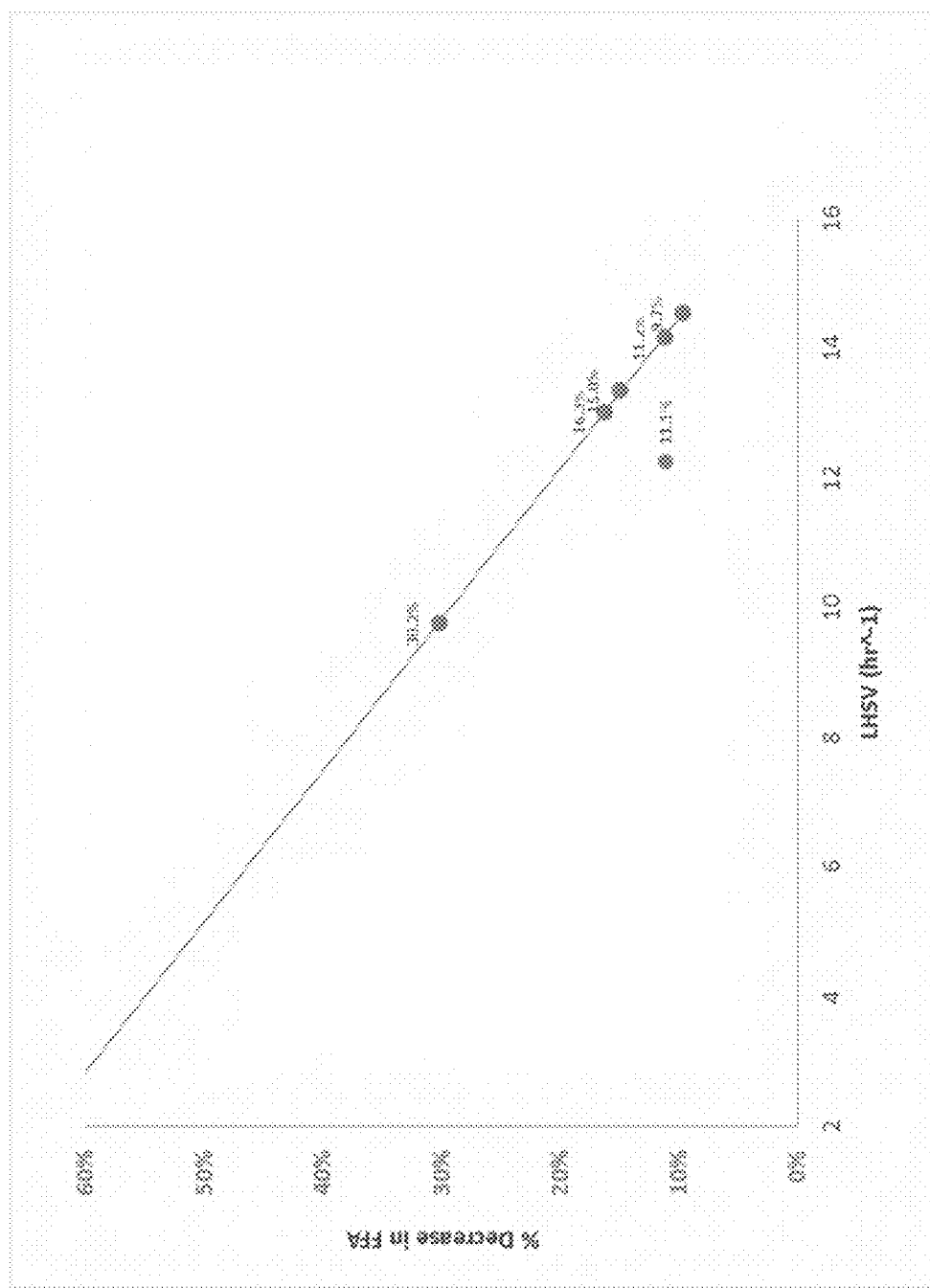
FIGS. 2-3 are plots of data from a pilot plant built according to FIG. 1.

Tests were performed on a 3 million gallon per year plant in Garnett, Kans. The results of the test are shown in Table 1. Partial reduction of free fatty acids ("FFA") was performed in a first stage reactor. The reactor was designed to be able to replace the catalyst online and to protect the primary reactor(s) from catalyst deactivation. Overall total liquid flow to fresh feed ratio for the reactor system was ~10 to 1. The total liquid flow to feed ratio for the first stage reactor varied from 2.11 to 4.25. First stage reactor inlet temperature ranged from 575 to 648° F. and initial FFA ranged from 4.96 to 9.98 percent. Percent decrease in FFA did not appear to be significantly affected by inlet temperature or initial percent FFA. Decrease percent of FFA was primarily dependent on the residence time (LHSV). The longer the residence time (lower LHSV) the greater the reduction of FFA (FIG. 2).

Figure 3:
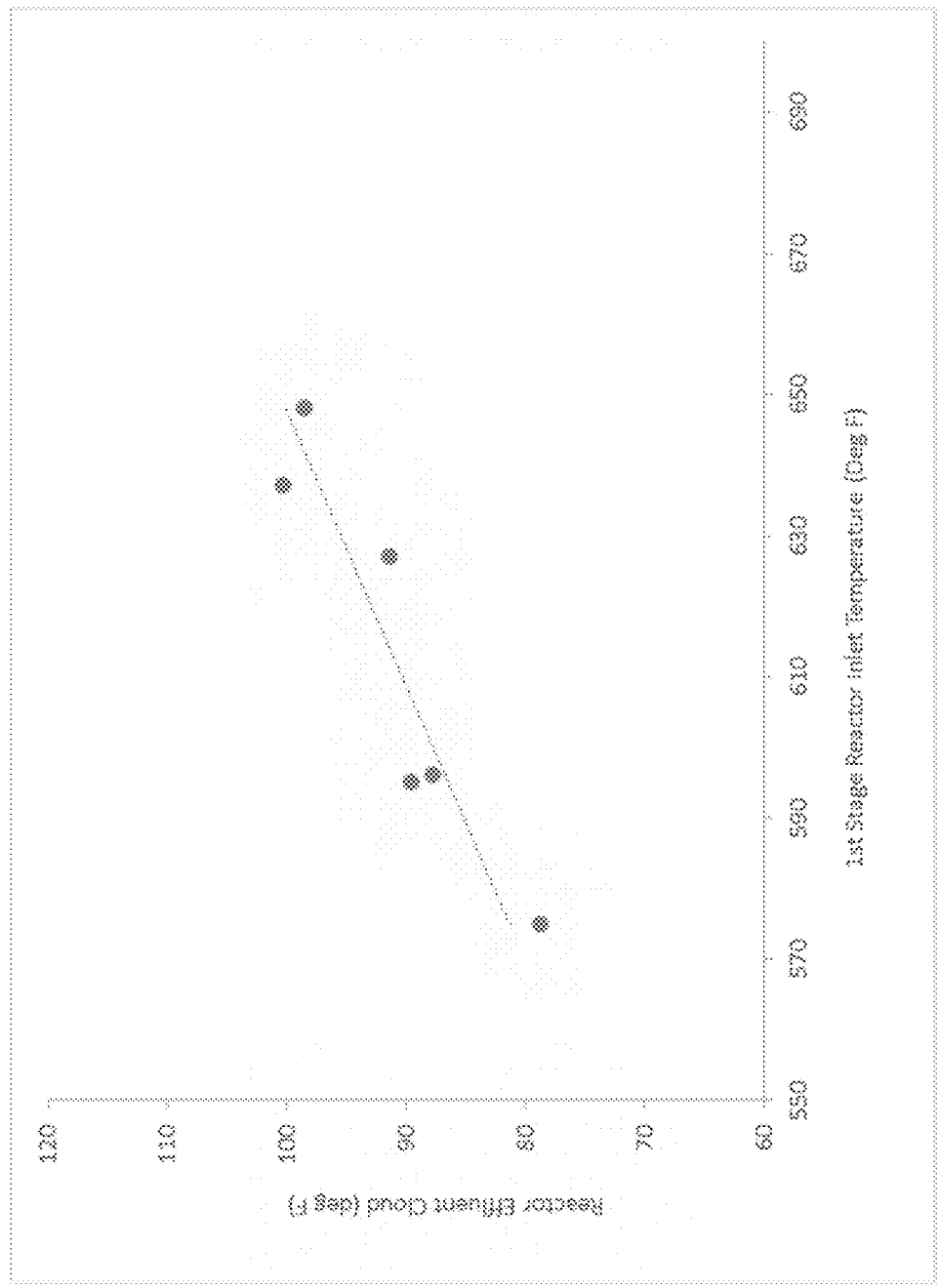

Using a low activity catalyst at reduced temperature to reduce FFA in the first stage reactor limits side reactions and reduces the formation of heavy molecules while allowing the primary reactor(s) to operate at higher temperatures due to the reduced FFA. Patent U.S. Pat. No. 8,002,258 B2 shows in Example 6 that operating below 626° F. significantly reduces side reactions. Plant data agreed with this showing that the reactor effluent cloud was reduced as the 1$^{st}$ stage reactor inlet temperature decreased, where higher cloud is an indication of the formation of heavy molecules (FIG. 3). U.S. Pat. No. 8,002,258 B2 shows in Table 3 that side reactions and the formation of heavy molecules is significantly reduced with the reduction of FFA.

The first stage reactor operates using a lower recycle rate than the primary reactor(s) to increase the residence time (lower LHSV) in the first stage reactor and allows for a smaller first stage reactor. The heat generated in the first stage reactor reduces the heat requirement for the primary reactor(s). The recycle rate is increased for the primary reactor(s) to limit the exotherm in the primary reactor(s).

TABLE 1

| LHSV | Total Liquid Flow/Fresh | Inlet Temp (deg F.) | H2 Flow (scfm) | Initial % FFA | % drop in FFA |
|---|---|---|---|---|---|
| 14.5 | 2.11 | 575 | 865 | 9.98 | 9.7% |
| 14.2 | 2.47 | 596 | 886 | 8.54 | 11.2% |
| 13.3 | 2.91 | 627 | 872 | 7.25 | 15.0% |
| 9.7 | 4.25 | 648 | 908 | 4.96 | 30.2% |
| 13.0 | 2.84 | 595 | 838 | 7.43 | 16.3% |
| 12.3 | 3.56 | 637 | 896 | 5.92 | 11.1% |

Other Exemplary Embodiments

1. A process that involves the hydrogenation, decarboxylation, decarbonylation, and/or hydrodeoxygenation of animal and/or plant fats, oils and/or greases (FOG) in a reaction zone to form paraffins
   where the reaction zone is separated into two or more reactors and/or beds
   where a liquid recycle stream is added before the first reactor and/or bed
   where the animal and/or plant FOG is partially reacted in the first reactor and/or bed
   where a liquid recycle stream is added in between two reactors and/or beds in at least one place in a series of two or more reactors and/or beds.
2. The process according to embodiment 1, wherein the LHSV to the first reactor and/or bed is more than 2 hr$^{-1}$ on a total feed basis
3. The process according to embodiment 1, wherein the LHSV to the first series of reactors and/or beds is more than 2 hr$^{-1}$ on a total feed basis.

4. The process according to embodiment 1, wherein the LHSV to the first reactor and/or bed is more than 5 hr$^{-1}$ on a total feed basis.
5. The process according to embodiment 1, wherein the LHSV to the first series of reactors and/or beds is more than 5 hr$^{-1}$ on a total feed basis.
6. The process according to embodiment 1, wherein it the first reactor and/or bed outlet temperature is more than the second reactor and/or bed inlet temperature.
7. The process according to embodiment 1, wherein the free fatty acid concentration is reduced in the reaction zone of the first reactor and/or bed.
8. The process according to embodiment 1, wherein the free fatty acid concentration is reduced in the reaction zone of the first series of reactors and/or beds.
9. The process according to embodiment 1, wherein the free fatty acid concentration is reduced in the reaction zone of the first reactor and/or bed below 5 wt % on a fresh feed basis.
10. The process according to embodiment 1, wherein the free fatty acid concentration is reduced in the reaction zone of the first series of reactors and/or beds below 5 wt % on a fresh feed basis.
11. The process according to embodiment 1, wherein FOG saturation is more than 25% in the reaction zone of the first reactor and/or bed.
12. The process according to embodiment 1, wherein FOG saturation is more than 25% in the reaction zone of the first series of reactors and/or beds.
13. The process according to embodiment 1, wherein FOG saturation is more than 50% in the reaction zone of the first reactor and/or bed.
14. The process according to embodiment 1, wherein FOG saturation is more than 50% in the reaction zone of the first series of reactors and/or beds.
15. The process according to embodiment 1, wherein FOG saturation is more than 75% in the reaction zone of the first reactor and/or bed.
16. The process according to embodiment 1, wherein FOG saturation is more than 75% in the reaction zone of the first series of reactors and/or beds.
17. The process according to embodiment 1, wherein FOG conversion to paraffin is less than 50 wt % in the reaction zone of the first reactor and/or bed.
18. The process according to embodiment 1, wherein FOG conversion to paraffin is less than 50 wt % in the reaction zone of the first series of reactors and/or beds.
19. The process according to embodiment 1, wherein FOG conversion to paraffin is less than 25 wt % in the reaction zone of the first reactor and/or bed.
20. The process according to embodiment 1, wherein FOG conversion to paraffin is less than 25 wt % in the reaction zone of the first series of reactors and/or beds.
21. The process according to embodiment 1, wherein FOG conversion to paraffin is less than 10 wt % in the reaction zone of the first reactor and/or bed.
22. The process according to embodiment 1, wherein FOG conversion to paraffin is less than 10 wt % in the reaction zone of the first series of reactors and/or beds.
23. The process according to embodiment 1, wherein it will be further processed in an isomerization step.
24. The process according to embodiment 1, wherein it will be further processed in an isomerization and/or cracking step to produce a lighter boiling point range product.
25. The process according to embodiment 1, wherein it will be further processed in an isomerization and/or cracking step to produce a jet/kerosene boiling range product.
26. The process according to embodiment 1, wherein it will be further processed in an isomerization and/or cracking step to produce a naphtha/gasoline boiling range product.
27. The process according to embodiment 1, wherein it will be further processed in an isomerization and/or cracking step to produce a fuel gas boiling range product.
28. A process that involves the hydrogenation, decarboxylation, decarbonylation, and/or hydrodeoxygenation of animal and/or plant fats, oils and/or greases (FOG) in a reaction zone to form paraffins
    where the reaction zone is separated into two or more reactors and/or beds
    where a liquid recycle stream is added before the first reactor and/or bed at a recycle to fresh feed ratio of less than 4:1
    where the animal and/or plant FOG is partially reacted in the first reactor and/or bed
    where a liquid recycle stream is added in between two reactors and/or beds in at least one place in a series of two or more reactors and/or beds.
29. The process according to embodiment 28, wherein the LHSV to the first reactor and/or bed is more than 2 hr$^{-1}$ on a total feed basis.
30. The process according to embodiment 28, wherein the LHSV to the first series of reactors and/or beds is more than 2 hr$^{-1}$ on a total feed basis.
31. The process according to embodiment 28, wherein the LHSV to the first reactor and/or bed is more than 5 hr$^{-1}$ on a total feed basis.
32. The process according to embodiment 28, wherein the LHSV to the first series of reactors and/or beds is more than 5 hr$^{-1}$ on a total feed basis.
33. The process according to embodiment 28, wherein it the first reactor and/or bed outlet temperature is more than the second reactor and/or bed inlet temperature.
34. The process according to embodiment 28, wherein the free fatty acid concentration is reduced in the reaction zone of the first reactor and/or bed.
35. The process according to embodiment 28, wherein the free fatty acid concentration is reduced in the reaction zone of the first series of reactors and/or beds.
36. The process according to embodiment 28, wherein the free fatty acid concentration is reduced in the reaction zone of the first reactor and/or bed below 5 wt % on a fresh feed basis.
37. The process according to embodiment 28, wherein the free fatty acid concentration is reduced in the reaction zone of the first series of reactors and/or beds below 5 wt % on a fresh feed basis.
38. The process according to embodiment 28, wherein FOG saturation is more than 25% in the reaction zone of the first reactor and/or bed.
39. The process according to embodiment 28, wherein FOG saturation is more than 25% in the reaction zone of the first series of reactors and/or beds.
40. The process according to embodiment 28, wherein FOG saturation is more than 50% in the reaction zone of the first reactor and/or bed.
41. The process according to embodiment 28, wherein FOG saturation is more than 50% in the reaction zone of the first series of reactors and/or beds.
42. The process according to embodiment 28, wherein FOG saturation is more than 75% in the reaction zone of the first reactor and/or bed.
43. The process according to embodiment 28, wherein FOG saturation is more than 75% in the reaction zone of the first series of reactors and/or beds.

44. The process according to embodiment 28, wherein FOG conversion to paraffin is less than 50 wt % in the reaction zone of the first reactor and/or bed.
45. The process according to embodiment 28, wherein FOG conversion to paraffin is less than 50 wt % in the reaction zone of the first series of reactors and/or beds.
46. The process according to embodiment 28, wherein FOG conversion to paraffin is less than 25 wt % in the reaction zone of the first reactor and/or bed.
47. The process according to embodiment 28, wherein FOG conversion to paraffin is less than 25 wt % in the reaction zone of the first series of reactors and/or beds.
48. The process according to embodiment 28, wherein FOG conversion to paraffin is less than 10 wt % in the reaction zone of the first reactor and/or bed.
49. The process according to embodiment 28, wherein FOG conversion to paraffin is less than 10 wt % in the reaction zone of the first series of reactors and/or beds.
50. The process according to embodiment 28, wherein it will be further processed in an isomerization step.
51. The process according to embodiment 28, wherein it will be further processed in an isomerization and/or cracking step to produce a lighter boiling point range product.
52. The process according to embodiment 28, wherein it will be further processed in an isomerization and/or cracking step to produce a jet/kerosene boiling range product.
53. The process according to embodiment 28, wherein it will be further processed in an isomerization and/or cracking step to produce a naphtha/gasoline boiling range product.
54. The process according to embodiment 28, wherein it will be further processed in an isomerization and/or cracking step to produce a fuel gas boiling range product.
55. A process that involves the hydrogenation, decarboxylation, decarbonylation, and/or hydrodeoxygenation of animal and/or plant fats, oils and/or greases (FOG) in a reaction zone to form paraffins
    where the reaction zone is separated into two or more reactors and/or beds
    where a liquid recycle stream is added before the first reactor and/or bed
    where the animal and/or plant FOG is partially reacted in the first reactor and/or bed
    where a liquid recycle stream is added in between two reactors and/or beds in at least one place in a series of two or more reactors and/or beds
    where the combination of all recycle streams to fresh feed ratio is greater than 8:1.
56. The process according to embodiment 55, wherein the LHSV to the first reactor and/or bed is more than 10 hr$^{-1}$ on a total feed basis.
57. The process according to embodiment 55, wherein the LHSV to the first series of reactors and/or beds is more than 10 hr$^{-1}$ on a total feed basis.
58. The process according to embodiment 55, wherein the LHSV to the first reactor and/or bed is more than 20 hr$^{-1}$ on a total feed basis.
59. The process according to embodiment 55, wherein the LHSV to the first series of reactors and/or beds is more than 20 hr$^{-1}$ on a total feed basis.
60. The process according to embodiment 55, wherein it the first reactor and/or bed outlet temperature is more than the second reactor and/or bed inlet temperature.
61. The process according to embodiment 55, wherein the free fatty acid concentration is reduced in the reaction zone of the first reactor and/or bed.
62. The process according to embodiment 55, wherein the free fatty acid concentration is reduced in the reaction zone of the first series of reactors and/or beds.
63. The process according to embodiment 55, wherein the free fatty acid concentration is reduced in the reaction zone of the first reactor and/or bed below 5 wt % on a fresh feed basis.
64. The process according to embodiment 55, wherein the free fatty acid concentration is reduced in the reaction zone of the first series of reactors and/or beds below 5 wt % on a fresh feed basis.
65. The process according to embodiment 55, wherein FOG saturation is more than 25% in the reaction zone of the first reactor and/or bed.
66. The process according to embodiment 55, wherein FOG saturation is more than 25% in the reaction zone of the first series of reactors and/or beds.
67. The process according to embodiment 55, wherein FOG saturation is more than 50% in the reaction zone of the first reactor and/or bed.
68. The process according to embodiment 55, wherein FOG saturation is more than 50% in the reaction zone of the first series of reactors and/or beds.
69. The process according to embodiment 55, wherein FOG saturation is more than 75% in the reaction zone of the first reactor and/or bed.
70. The process according to embodiment 55, wherein FOG saturation is more than 75% in the reaction zone of the first series of reactors and/or beds.
71. The process according to embodiment 55, wherein FOG conversion to paraffin is less than 50 wt % in the reaction zone of the first reactor and/or bed.
72. The process according to embodiment 55, wherein FOG conversion to paraffin is less than 50 wt % in the reaction zone of the first series of reactors and/or beds.
73. The process according to embodiment 55, wherein FOG conversion to paraffin is less than 25 wt % in the reaction zone of the first reactor and/or bed.
74. The process according to embodiment 55, wherein FOG conversion to paraffin is less than 25 wt % in the reaction zone of the first series of reactors and/or beds.
75. The process according to embodiment 55, wherein FOG conversion to paraffin is less than 10 wt % in the reaction zone of the first reactor and/or bed.
76. The process according to embodiment 55, wherein FOG conversion to paraffin is less than 10 wt % in the reaction zone of the first series of reactors and/or beds.
77. The process according to embodiment 55, wherein it will be further processed in an isomerization step.
78. The process according to embodiment 55, wherein it will be further processed in an isomerization and/or cracking step to produce a lighter boiling point range product.
79. The process according to embodiment 55, wherein it will be further processed in an isomerization and/or cracking step to produce a jet/kerosene boiling range product.
80. The process according to embodiment 55, wherein it will be further processed in an isomerization and/or cracking step to produce a naphtha/gasoline boiling range product.
81. The process according to embodiment 55, wherein it will be further processed in an isomerization and/or cracking step to produce a fuel gas boiling range product.
82. A process that involves the hydrogenation, decarboxylation, decarbonylation, and/or hydrodeoxygenation of animal and/or plant fats, oils and/or greases (FOG) in a reaction zone to form paraffins
    where the reaction zone is separated into two or more reactors and/or beds where a liquid recycle stream is added before the first reactor and/or bed at a recycle to fresh feed ratio of less than 4:1 where the animal and/or plant FOG is partially reacted in the first reactor and/or bed where a liquid recycle stream is added in between two reactors and/or beds in at least one place in a series of two or more reactors and/or beds where the combination of all recycle streams to fresh feed ratio is greater than 8:1.

83. The process according to embodiment 82, wherein the LHSV to the first reactor and/or bed is more than 2 $hr^{-1}$ on a total feed basis.

84. The process according to embodiment 82, wherein the LHSV to the first series of reactors and/or beds is more than 2 $hr^{-1}$ on a total feed basis.

85. The process according to embodiment 82, wherein the LHSV to the first reactor and/or bed is more than 5 $hr^{-1}$ on a total feed basis.

86. The process according to embodiment 82, wherein the LHSV to the first series of reactors and/or beds is more than 5 $hr^{-1}$ on a total feed basis.

87. The process according to embodiment 82, wherein it the first reactor and/or bed outlet temperature is more than the second reactor and/or bed inlet temperature.

88. The process according to embodiment 82, wherein the free fatty acid concentration is reduced in the reaction zone of the first reactor and/or bed.

89. The process according to embodiment 82, wherein the free fatty acid concentration is reduced in the reaction zone of the first series of reactors and/or beds.

90. The process according to embodiment 82, wherein the free fatty acid concentration is reduced in the reaction zone of the first reactor and/or bed below 5 wt % on a fresh feed basis.

91. The process according to embodiment 82, wherein the free fatty acid concentration is reduced in the reaction zone of the first series of reactors and/or beds below 5 wt % on a fresh feed basis.

92. The process according to embodiment 82, wherein FOG saturation is more than 25% in the reaction zone of the first reactor and/or bed.

93. The process according to embodiment 82, wherein FOG saturation is more than 25% in the reaction zone of the first series of reactors and/or beds.

94. The process according to embodiment 82, wherein FOG saturation is more than 50% in the reaction zone of the first reactor and/or bed.

95. The process according to embodiment 82, wherein FOG saturation is more than 50% in the reaction zone of the first series of reactors and/or beds.

96. The process according to embodiment 82, wherein FOG saturation is more than 75% in the reaction zone of the first reactor and/or bed.

97. The process according to embodiment 82, wherein FOG saturation is more than 75% in the reaction zone of the first series of reactors and/or beds.

98. The process according to embodiment 82, wherein FOG conversion to paraffin is less than 50 wt % in the reaction zone of the first reactor and/or bed.

99. The process according to embodiment 82, wherein FOG conversion to paraffin is less than 50 wt % in the reaction zone of the first series of reactors and/or beds.

100. The process according to embodiment 82, wherein FOG conversion to paraffin is less than 25 wt % in the reaction zone of the first reactor and/or bed.

101. The process according to embodiment 82, wherein FOG conversion to paraffin is less than 25 wt % in the reaction zone of the first series of reactors and/or beds.

102. The process according to embodiment 82, wherein FOG conversion to paraffin is less than 10 wt % in the reaction zone of the first reactor and/or bed.

103. The process according to embodiment 82, wherein FOG conversion to paraffin is less than 10 wt % in the reaction zone of the first series of reactors and/or beds.

104. The process according to embodiment 82, wherein it will be further processed in an isomerization step.

105. The process according to embodiment 82, wherein it will be further processed in an isomerization and/or cracking step to produce a lighter boiling point range product.

106. The process according to embodiment 82, wherein it will be further processed in an isomerization and/or cracking step to produce a jet/kerosene boiling range product.

107. The process according to embodiment 82, wherein it will be further processed in an isomerization and/or cracking step to produce a naphtha/gasoline boiling range product.

108. The process according to embodiment 82, wherein it will be further processed in an isomerization and/or cracking step to produce a fuel gas boiling range product.

What is claimed is:

1. A method for processing plant and/or animal FOG in a reaction zone to form paraffins comprising:
   providing a first feed to a reaction zone comprising a plurality of reactors or beds;
   partially reacting the FOG within a first of the plurality of reactors or beds at temperatures less than about 648° F.;
   providing a second feed to a second of the plurality of reactors or beds;
   reacting a remaining quantity of the FOG from the first of the plurality of reactors or beds within the second of the plurality of reactors or beds;
   wherein the first feed includes an unreacted fresh feed component and a first recycled component which is obtained from a point downstream of the reaction zone and the ratio of the first recycled component to the fresh feed component is less than 4:1;
   wherein the second feed includes a product component from the first of the reactors or beds and a second recycled component which is obtained from a point downstream of the reaction zone and the ratio of a combination of all recycle streams to the fresh feed component is greater than 8:1; and
   wherein a ratio of the first recycled component to the first feed is less than a ratio of the second recycled component to the second feed.

2. The method according to claim 1, wherein the LHSV to the first of the plurality of reactors or beds is more than 2 $hr^{-1}$ on a total feed basis.

3. The method according to claim 1, wherein the LHSV to the first of the plurality of reactors or beds is more than 5 $hr^{-1}$ on a total feed basis.

4. The method according to claim 1, wherein it an outlet temperature of the first plurality of reactors or beds is greater than an inlet temperature of the second of the plurality of reactors or beds.

5. The method according to claim 1, wherein the free fatty acid concentration of the product component from the first reactor is less than free fatty acid concentration of the first feed.

6. The method according to claim 5, wherein the free fatty acid concentration is reduced in the reaction zone to no more than 5 wt % on a fresh feed basis.

7. The method according to claim 1, wherein FOG saturation is more than 25% in the first of the plurality of reactors or beds.

8. The method according to claim 1, wherein FOG saturation is more than 50% in the first of the plurality of reactors or beds.

9. The method according to claim 1, wherein FOG saturation is more than 75% in the first of the plurality of reactors or beds.

10. The method according to claim 1, wherein FOG conversion to paraffin is less than 50 wt % in the first of the plurality of reactors or beds.

11. The method according to claim 1, wherein FOG conversion to paraffin is less than 25 wt % in the first of the plurality of reactors or beds.

12. The method according to claim 1, wherein FOG conversion to paraffin is less than 10 wt % in the first of the plurality of reactors or beds.

13. The method according to claim 1, wherein a product stream from the reactor zone is further processed in an isomerization step.

14. The method according to claim 1, wherein a product stream from the reactor zone is further processed in an isomerization and/or cracking step to produce a lighter boiling point range product.

15. The method according to claim 14, wherein the product stream from the reactor zone is further processed in an isomerization and/or cracking step to produce a jet/kerosene boiling range product.

16. The method according to claim 14, wherein the product stream from the reactor zone is further processed in an isomerization and/or cracking step to produce a naphtha/gasoline boiling range product.

17. The method according to claim 1, wherein a product stream from the reactor zone is further processed in an isomerization and/or cracking step to produce a fuel gas boiling range product.

* * * * *